United States Patent
Oh

(10) Patent No.: US 6,896,711 B2
(45) Date of Patent: May 24, 2005

(54) GRILL ASSEMBLY FOR A CYCLONE-TYPE DUST COLLECTING APPARATUS FOR A VACUUM CLEANER

(75) Inventor: Jang-keun Oh, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 420 days.

(21) Appl. No.: 10/156,032

(22) Filed: May 28, 2002

(65) Prior Publication Data

US 2003/0159238 A1 Aug. 28, 2003

(30) Foreign Application Priority Data

Feb. 27, 2002 (KR) ......................................... 2002-10504

(51) Int. Cl.[7] ............................ B01D 45/12; A47L 9/16
(52) U.S. Cl. ......................... 55/337; 55/436; 55/459.1; 55/DIG. 3; 15/353
(58) Field of Search .............................. 55/337, DIG. 3, 55/393, 436, 462, 490, 459.1; 15/353

(56) References Cited

U.S. PATENT DOCUMENTS

| | | | |
|---|---|---|---|
| 1,913,115 A | | 6/1933 | Guest |
| 2,171,248 A | * | 8/1939 | Van Berkel .................. 55/392 |
| 6,195,835 B1 | | 3/2001 | Song et al. |
| 2002/0178699 A1 | * | 12/2002 | Oh .............................. 55/337 |
| 2003/0066273 A1 | * | 4/2003 | Choi et al. ..................... 55/337 |

FOREIGN PATENT DOCUMENTS

| | | |
|---|---|---|
| AU | 758453 | 3/2003 |
| CA | 978485 | 11/1975 |
| DE | 39 15457 A1 | 11/1990 |
| DE | 101 10581 A1 | 11/2001 |
| EP | 1 136 028 A2 | 9/2001 |
| JP | 04084919 A * | 3/1992 |
| WO | WO0105291 | 1/2001 |

OTHER PUBLICATIONS

German Examination Report (issue date: Dec. 3, 2002) issue from the German Patent Office with respect to German Patent Application No. 10227355.3 filed on Jun. 19, 2002; also the German Examination Report is Translated in English.

* cited by examiner

*Primary Examiner*—Frank M. Lawrence
(74) *Attorney, Agent, or Firm*—Ladas & Parry LLP

(57) ABSTRACT

A grill assembly for a cyclone-type dust collecting apparatus has a grill member having a grill supporting portion supported on the air outlet, a conical grill and a cylindrical grill portion, preferably integrally formed with each other. The dust blocking member has a connection member inserted and connected through the air passage hole of the cylindrical grill portion, and has a plurality of holes partitioned by a rib and interconnected with the air passage hole; and a dust blocking plate integrally formed with the connection member that is spaced from the connection member, air is discharged through the air passage hole extending through the lower portion of the grill assembly, and dust and foreign substances particularly adhere around the air passage hole.

6 Claims, 5 Drawing Sheets

GRILL ASSEMBLY FOR A CYCLONE-TYPE DUST COLLECTING APPARATUS FOR A VACUUM CLEANER

CLAIM OF PRIORITY

This application hereby refers to, and incorporates herein by reference, an earlier filed patent application entitled GRILL ASSEMBLY FOR A CYCLONE-TYPE DUST COLLECTING APPARATUS FOR A VACUUM CLEANER, filed in the Korean Industrial Property Office on Feb. 27, 2002, and there duly assigned Ser. No. 2002-10504. Applicant hereby claims all benefits accruing under 35 U. S. C. Section 119 for and from said earlier filed Korean patent application.

BACKGROUND OF THE INVENTION

1. Field of the Invention

The present invention relates to a cyclone-type dust collecting apparatus for a vacuum cleaner, and more particularly, to a grill assembly of a cyclone-type dust collecting apparatus for separating dust or filth from the air whirling in the cyclone-type dust collecting apparatus.

2. Description of the Prior Art

A cyclone-type dust collecting apparatus separates particles from a fluid by using a centrifugal force. Due to its simple structure and high resistance to high temperature and high pressure, the cyclone-type dust collecting apparatus has been used in many industrial fields and even in a vacuum cleaner.

The vacuum cleaner having the cyclone-type dust collecting apparatus is constructed so that relatively large particles of contaminants are firstly filtered in the cyclone-type dust collecting apparatus before contaminant-laden air is directed to a paper filter of the cleaner body. In this arrangement, the amount of contaminants that have to be filtered by the paper filter decreases, and so the usable life of the paper filter is lengthened. Also, problems like suction force deterioration and motor overload, which are caused when the paper filter is blocked or filled with the contaminants, can be also prevented.

U.S. Pat. No. 6,195,835 (application Ser. No. 09/388,532) issued Mar. 6, 2001 to the same applicant discloses a vacuum cleaner having the above-described cyclone-type dust collecting apparatus.

FIG. 1 herein is a sectional view schematically showing the structure and operation of the cyclone dust collecting apparatus for a vacuum cleaner of the type disclosed in U.S. Pat. No. 6,195,835.

As shown in FIG. 1 of this application, the cyclone-type dust collecting apparatus 10 of the U.S. Pat. No. 6,195,835 is disposed on extension pipes 1a and 1b of the vacuum cleaner. By using a centrifugal force, the cyclone-type dust collecting apparatus 10 separates and collects dust and filth from contaminant-laden air that is drawn in through a suction port of the cleaner. The cyclone-type dust collecting apparatus 10 includes a cyclone body 20, a dust receptacle 30 and a grill assembly 40.

The cyclone body 20 has a first connection pipe 21 connected to the extension pipe 1a at the suction port of the cleaner, a second connection pipe 22 connected to the extension pipe 1b at a body of the cleaner, an air inlet 23 interconnected with the first connection pipe 21 and an air outlet 24 interconnected with the second connection pipe 22. The contaminant-laden air is drawn into the cyclone body 20 through the air inlet 23, forming a vortex of air.

The dust receptacle 30 is connected to the cyclone body 20, and collects the contaminants that are separated from the air by the centrifugal force of the vortex of air generated in the cyclone body 20.

The grill assembly 40 is disposed on the lower side of the air outlet 24 of the cyclone body 20, and has a grill supporting portion 41, a conical grill portion 42 and a cylindrical grill portion 43. The cylindrical grill portion 43 has a plurality of fine holes 43a formed therein, and a conical dust blocking plate 44 formed on an end.

In the vacuum cleaner having the cyclone-type dust collecting apparatus as described above, contaminant-laden air is drawn by the suction force generated at the suction port of the cleaner, and the air enters the cyclone body 20 through the first connection pipe 21 in a diagonal direction. The air is diagonally drawn into the cyclone body 20 in a helical whirling current that moves downward to the bottom of the dust receptacle 30. During this process, contaminants are separated from the air by the centrifugal force of the whirling air current, and they are collected in the dust receptacle 30 after falling along an inner wall of the dust receptacle 30. The air reaching the bottom of the dust receptacle 30 then turns in direction and moves upward in a smaller radius vortex, and flows from the outside of the cleaner body through the fine holes 43a of the grill assembly 40, through the air outlet 24 and the second connection pipe 1b. Thus, the contaminants entrained in the air are blocked at the fine holes 43a of the grill assembly 40, and fall into the dust receptacle 30. Relatively large particles of the contaminants are also blocked by the dust blocking plate 44 and thus, they are collected in the dust receptacle 30.

In the vacuum cleaner having the cyclone-type dust collecting apparatus described above, dust and filth entrained in the air drawn into the suction port of the cleaner are firstly filtered and collected by the cyclone-type dust collecting apparatus, and as a result, the amount of contaminants that the paper filter has to filter decreases, and the usable life of the paper filter is extended.

The vacuum cleaner having the cyclone-type dust collecting apparatus described above has some problems, however. That is, as the whirling air in the dust receptacle 30 flows through the plurality of fine holes 43a of the grill assembly 40, dust and minute particles of the contaminants become attached to the grill assembly 40. As additional dust and foreign substances attach to the overall area of the grill assembly 40 as time goes by, those substances clog the fine holes 43a and block the outflow of air. This air flow blockage causes problems like suction force deterioration and motor overload, and so it becomes necessary to remove the dust and filth regularly. In the conventional case, however, since the dust and filth is attached to the overall area of the grill assembly 40, it is quite tricky to completely remove the dust and filth from the grill assembly 40. Accordingly, it is necessary to either prevent the dust and filth from attaching to the grill assembly 40, or to allow dust and filth to attach only to a certain area of the grill assembly 40 for easy removal thereof.

SUMMARY OF THE INVENTION

The present invention has been made to overcome the above-mentioned problems of the prior art. Accordingly, it is an object of the present invention to provide a grill assembly for a cyclone-type dust collecting apparatus for a vacuum cleaner which is designed for easy removal of dust and foreign substances; which has an improved air discharging passage in which air is discharged through a lower portion of the grill assembly, to thereby allow dust and foreign substances to attach only to a lower side of the grill assembly.

The above object is accomplished by a grill assembly for a cyclone-type dust collecting apparatus for a vacuum cleaner according to the present invention, including a grill member having an air passage holes extending through a lower grill blocking member removably mounted on the grill assembly over the air passage hole of the grill member; and a fixing unit for removably fixing the dust blocking member with respect to the grill member.

The grill member includes a grill supporting portion supported on the air outlet, a conical grill and a cylindrical grill portion, all of which are integrally formed with each other, and the cylindrical grill portion has the air passage hole extending through a lower portion.

The dust blocking member includes a connection member inserted and connected through the air passage hole of the cylindrical grill portion, and it has a plurality of holes partitioned by a rib and interconnected with the air passage hole; and a dust blocking plate integrally formed with the connection member at a lower portion of the connection member, the dust blocking plate being spaced from the connection member by a predetermined distance.

The fixing unit includes a fixing groove portion having a pair of guiding grooves formed to be substantially opposite to each other in an inner circumference of the cylindrical grill portion, and a pair of fixing grooves extending from leading ends of the guiding grooves in a radial direction of the cylindrical grill portion and in an opposite direction from each other; and a fixing protrusion portion formed on an outer circumference of the connection member to correspond to the guiding grooves and the fixing grooves of the fixing groove portion.

According to the preferred embodiment of the present invention, the cylindrical grill portion of the grill member has a first cylindrical grill portion having a predetermined diameter and a second cylindrical grill portion having a diameter larger than the first cylindrical grill portion.

BRIEF DESCRIPTION OF THE DRAWINGS

The above-mentioned objects and the feature of the present invention will become more apparent by reference to the detailed description and appended drawings, in which.

DETAILED DESCRIPTION OF PREFERRED EMBODIMENTS

Figure 1:
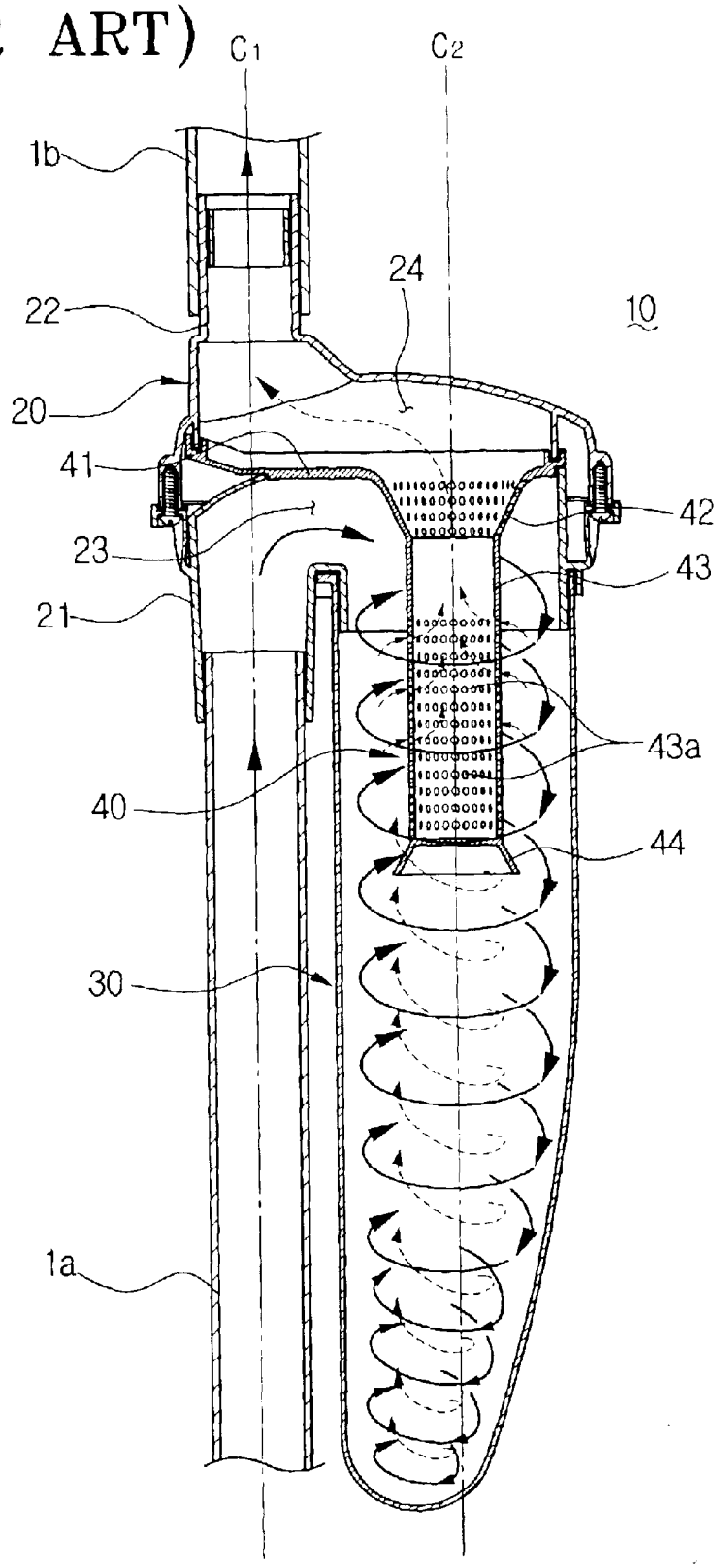
FIG. 1 is a sectional view of a prior art conventional cyclone-type dust collecting apparatus for a vacuum cleaner.

The preferred embodiment of the present invention will be described in greater detail with reference to the accompanying drawings. Throughout the description, the like elements with the same function will be given the same reference numerals.

As shown in FIGS. 2 through 5, a grill assembly 100 for a cyclone-type dust collecting apparatus for vacuum cleaner according to the first preferred embodiment of the present invention includes a grill member 110, a dust blocking member 120 and a fixing unit 130.

The grill member 110 is disposed at the air outlet 24 of the cyclone body 20, and has a grill supporting portion 111, a conical grill portion 112 and a cylindrical grill portion 113 which are integrally formed with each other. The cylindrical grill portion 113 has an air passage hole 114 through a lower portion.

Figure 4:
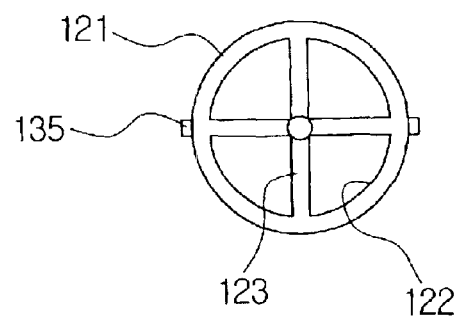
FIG. 4 is a plan view of a dust blocking member of the grill assembly of FIG. 2.

The dust blocking member 120 is removably mounted on the grill member 110 through the air passage hole 114 of the grill member 110, and has a connection member 121 and a dust blocking plate 125. The connection member 121 is inserted and connected to the air passage hole 114 of the cylindrical grill portion 113, and has a rib member 123 formed therein to partition an inner space into a plurality of holes 122 that are interconnected with the air passage hole 114. The dust blocking plate 125 is integrally formed on the lower portion of the connection member 121 so as to be spaced from the connection member 121 by a predetermined distance. Preferably, the predetermined distance between the dust blocking plate 125 and the connection member 121 is 8 mm. As for the rib member 123, there could be four (4) ribs arranged at intervals of 90° as shown in FIG. 4. Alternatively, there could be three (3) ribs formed at intervals of 120°, or only one (1) rib is also possible. In any case, however, the dust blocking plate 125 is connected to the center of the rib member 123.

Figure 5:
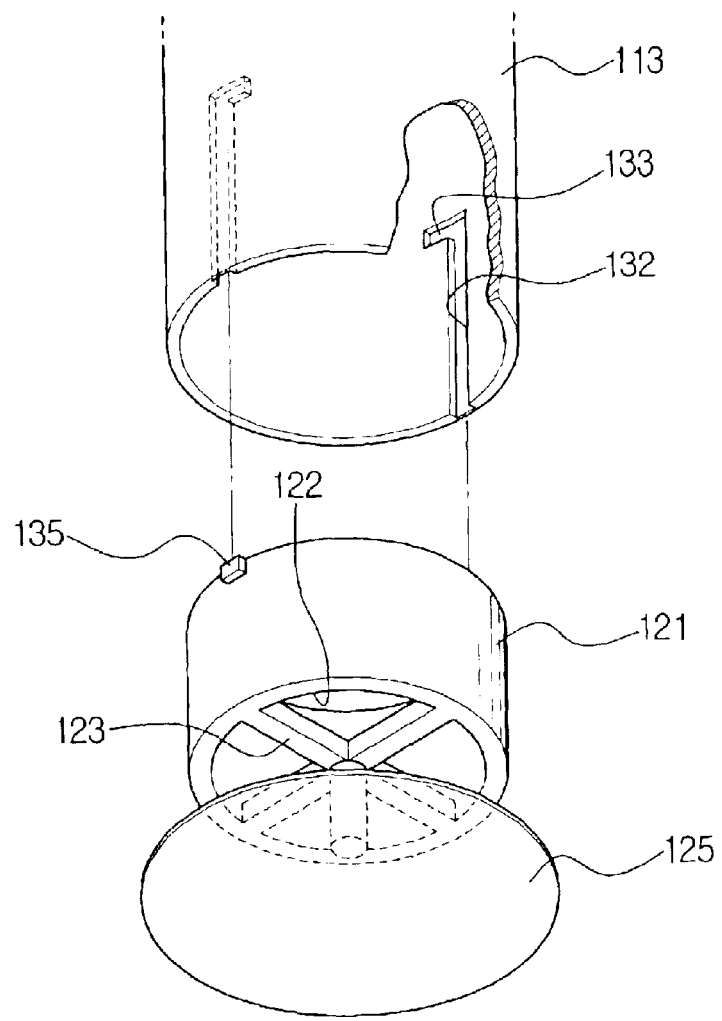
FIG. 5 is a detailed exploded isometric view showing the connection structure of the dust blocking member with respect to the grill member of the grill assembly.

The fixing unit 130 removably fixes the dust blocking member 120 with respect to the grill member 110, and has a locking groove 131 formed in the cylindrical grill portion 113 and a locking protrusion portion 135 formed on the connection member 121. The fixing groove portion 131 has a pair of guiding grooves 132 formed to be substantially opposite to each other in an inner circumference of the cylindrical grill portion 113, and they extend in an axial direction. A pair of locking grooves 133 extend from leading ends of the guiding grooves 132 in a radial direction of the cylindrical grill portion 113 and in opposite directions from each other. The locking protrusion portions 135 are formed on an outer circumference of the connection member 121, in positions to mate with the guiding grooves 132 and the locking grooves 133 of the locking groove portion 131. Accordingly, as shown in FIG. 5, in order to lock the dust blocking member 120 in the grill member 110, a user aligns and inserts the locking protrusion portion 135 of the connection member 121 to the guiding grooves 132 of the cylindrical grill portion 113, and turns the connection member 121 at the ends of the guiding grooves 132 to thereby position the locking protrusion portion 135 at the locking grooves 133. The dust blocking member 120 is separated from the grill member 110 by reversing the procedure.

Although this embodiment discloses the locking groove portion 131 and the locking protrusion portion 135 for fixing the dust blocking member 120 to the grill member 110, it is not limited thereto. Any suitable connecting arrangement, such as a threaded attachment, can also be employed.

Figure 2:
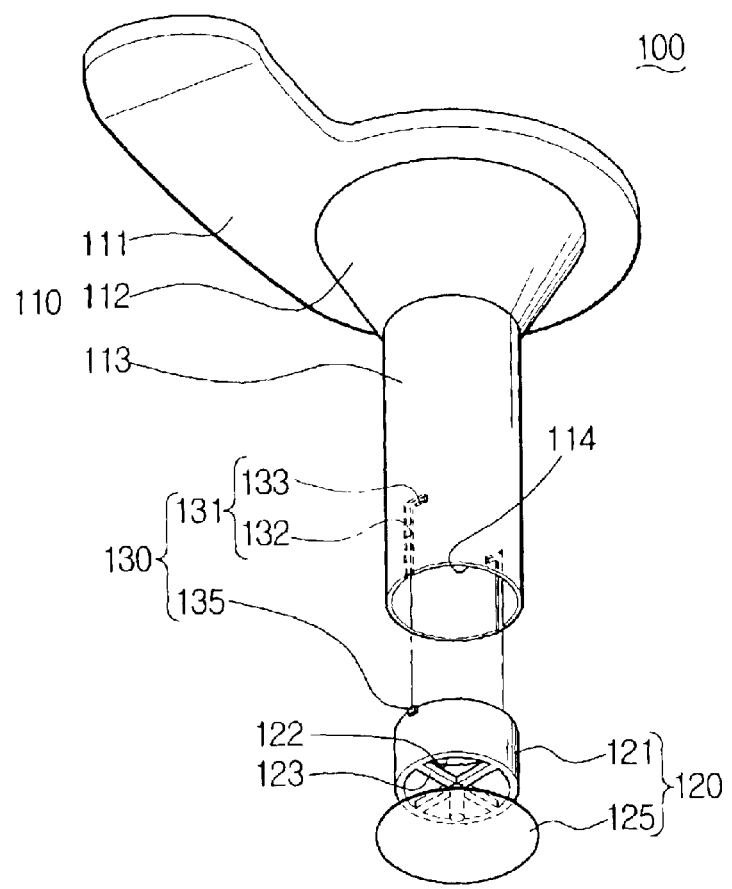
FIG. 2 is an exploded isometric view of a grill assembly for a cyclone-type dust collecting apparatus for a vacuum cleaner according to a first preferred embodiment of the present invention.
Figure 3:
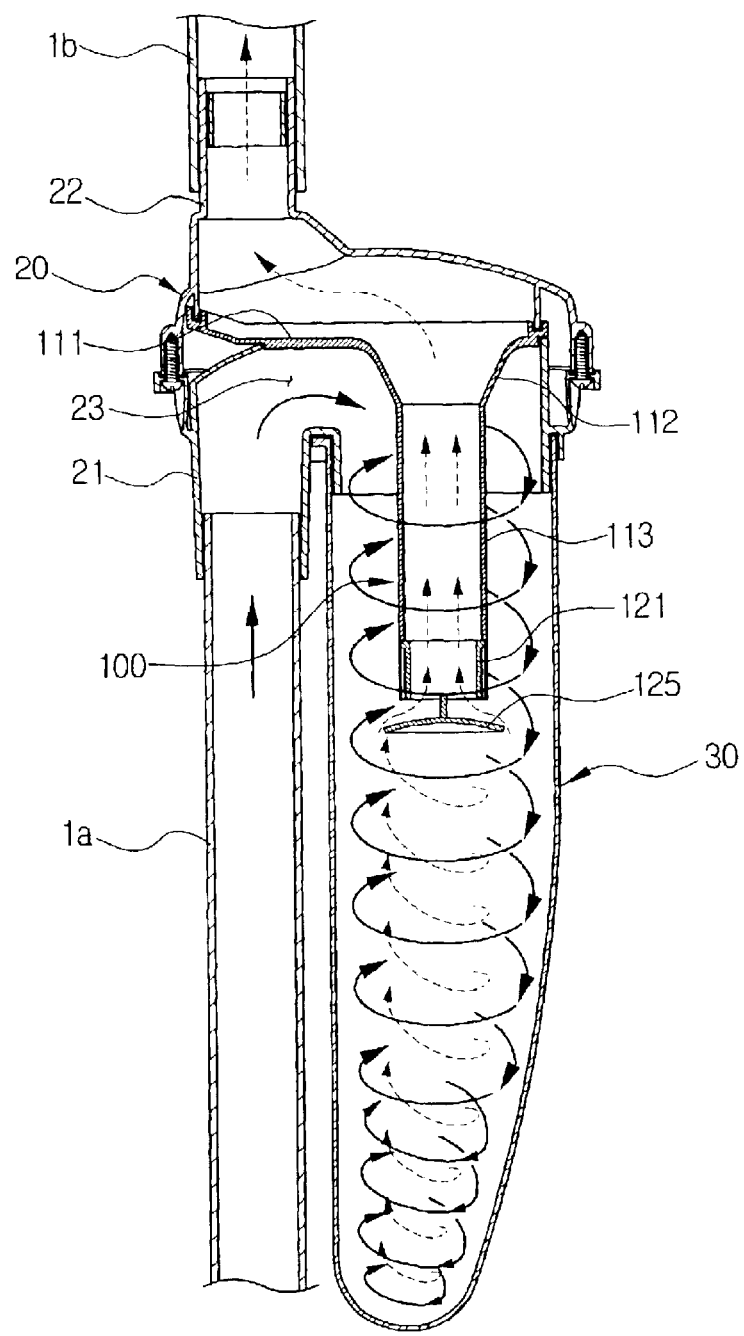
FIG. 3 is a sectional view showing the grill assembly of FIG. 2 being employed in the cyclone-type dust collecting apparatus according to the first preferred embodiment of the present invention.

The operation of the cyclone-type dust collecting apparatus having the grill assembly according to the first preferred embodiment of the present invention is effective. As shown in FIG. 2 and FIG. 3, the grill assembly 100 is mounted so that the grill supporting portion 111 is supported on the air outlet 24 of the cyclone body 20 (FIG. 1). The cyclone-type dust collecting apparatus 10 having the grill assembly 100 is, like the conventional one, disposed on the extension pipes 1a and 1b.

The contaminant-laden air, drawn in through the suction port (not shown) of the cleaner, enters the cyclone body 20 in a diagonal direction through the first connection pipe 21, into a helical whirling current that moves downward to the bottom of the dust receptacle 30. In this process, dust and filth entrained in the air are separated by the centrifugal force of the whirling air, and are collected in the dust receptacle 30 along the inner wall of the dust receptacle 30. Then, the contaminant-laden air moves helically upwardly with a smaller radius of rotation after being reflected from the bottom of the dust receptacle 30, and is discharged into the cleaner body through the air passage hole 114 of the grill assembly 50, the air outlet 24 and the second connection pipe 23. The contaminants entrained in the upwardly moving air current are blocked by the dust blocking plate 125 of the grill assembly 100 and fall into the dust receptacle 30.

As described above, according to the present invention, the air is discharged through the air passage hole 114 extending through the lower portion of the grill assembly 100 after being reflected from the bottom of the dust receptacle 30. Accordingly, dust and foreign substances entrained in the reflected air current do not adhere to the surface of the grill assembly 100, but attach particularly around the air passage hole 114, i.e., around the holes 122 of the connection member 121 of the dust blocking member 120. Generally, the collection of large amounts of dust and foreign substances upon elements defining the air discharge path of the grill assembly 100 is unavoidable. However, in the present invention (unlike the conventional system in which the large amounts of dust and foreign substances adhere to the overall area of the grill assembly 100), dust and foreign substances adhere around the holes 122 of the connection member 121 of the dust blocking member 120. As a result, this dust and these foreign substances can be removed easily by separating the dust blocking member 120 from the grill member 110.

Figure 6:
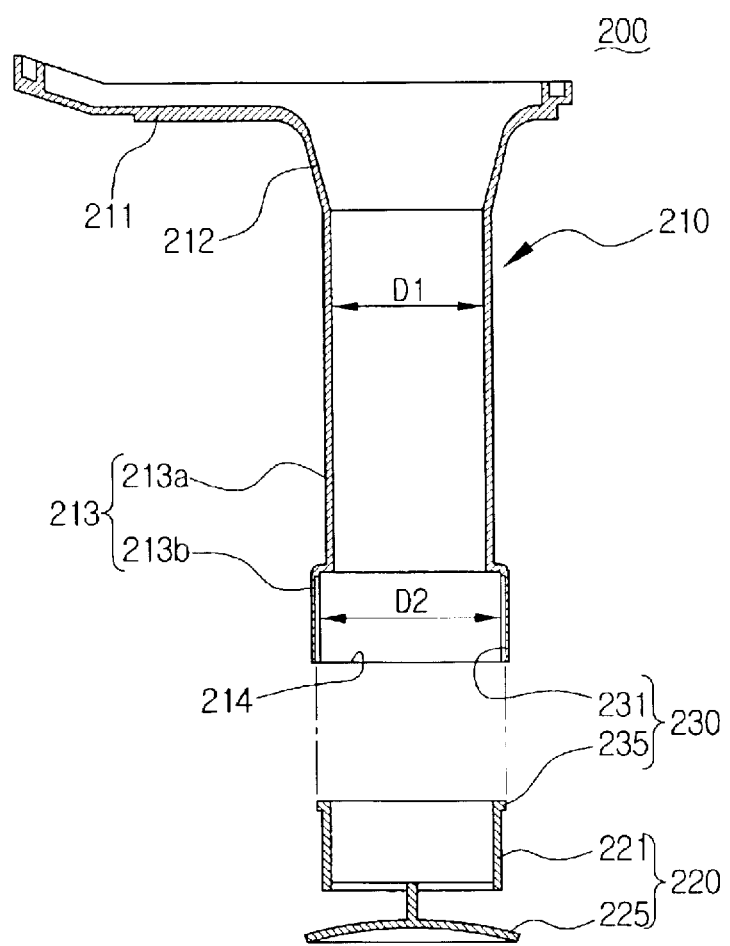
FIG. 6 is a sectional view showing the grill assembly for a cyclone-type dust collecting apparatus according to a second preferred embodiment of the present invention.

As shown in FIG. 6, the grill assembly 200 according to a second preferred embodiment of the present invention has almost the same structure as the grill assembly 100 according to the first preferred embodiment. The only difference between the grill assembly 200 and the grill assembly 100 is that the cylindrical grill portion 213 of the grill member 210 of the grill assembly 200 has a first cylindrical grill portion 213a of a certain diameter D1 and a second cylindrical grill portion 213b of a larger diameter D2. Accordingly, the like elements with the same function will be given reference numerals corresponding to the reference numerals in FIG. 2; the detailed description of the like elements is omitted.

The first cylindrical grill portion 213a preferably has a diameter D1 of 35 mm, while the second cylindrical grill portion 213b has the diameter D2 of 45 mm. The grill assembly 200 has a larger air passage hole 214, and accordingly has an air suctioning efficiency comparable to and as stable as the conventional grill assembly that has a plurality of fine holes. However, this grill assembly 200 can be removed and cleaned with considerable ease and convenience.

In accordance with the present invention, since the air discharge path is defined through the air passage hole 214 that extends through the lower portion of the grill assembly 100, 200, dust and filth do not adhere to the surface of the grill assembly 100, 200 during cleaning operation, but adhere particularly to the dust blocking member 120 that is removably connected to the grill assembly 110, 210. Accordingly, the user can remove dust and foreign substances from the dust blocking member 120 with ease and convenience, since the user is simply required to remove the dust blocking member 120 from the grill member 110.

Although the preferred embodiments of the present invention have been described, it will be understood by those skilled in the art that the present invention should not be limited to the described preferred embodiments. On the contrary, various changes and modifications can be made within the spirit and scope of the present invention as defined by the appended claims.

What is claimed is:

1. A grill assembly for a cyclone-type dust collecting apparatus for a vacuum cleaner, the grill assembly being disposed in an air outlet of a cyclone body for separating dust and foreign substances from contaminant-laden air, the grill assembly comprising:

a grill member having an air passage hole extending through a lower grill portiong grill supporting portion supported on the air outlet, a conical grill and a cylindrical grill portion, all of which are integrally formed with each other, and the cylindrical grill portion further having an air passage hole extending through a lower grill portion thereof;

a dust blocking member removably mounted on the grill assembly through the air passage hole of the grill member; and fixing means for removably fixing the dust blocking member with respect to the grill member.

2. The grill assembly of claim 1, wherein the dust blocking member further comprises:

a connection member inserted and connected to the cylindrical grill portion through the air passage hole of the cylindrical grill portion, and having a plurality of holes that are partitioned by a rib and interconnected with the air passage hole; and a dust blocking plate integrally formed with the connection member at a lower portion of the connection member, the dust blocking plate being spaced from the connection member by a predetermined distance.

3. The grill assembly of claim 2, wherein the fixing means further comprises:

a fixing groove portion having a pair of guiding grooves formed to be substantially opposite to each other in an inner circumference of the cylindrical grill portion, and a pair of fixing grooves extending from leading ends of the guiding grooves in a radial direction of the cylindrical grill portion and in opposite directions from each other; and a fixing protrusion portion formed on an outer circumference of the connection member to mate with the guiding grooves and the fixing grooves of the fixing groove portion.

4. The grill assembly of claim 1, wherein the grill member further comprises:

a conical grill portion;

a first cylindrical grill portion of a predetermined diameter; and a second cylindrical grill portion of a diameter larger than the diameter of the first cylindrical grill portion, the conical grill portion, the first cylindrical grill portion and the second cylindrical grill portion being integrally formed on the grill supporting portion that is supported on an air outlet, and the second cylindrical grill portion having an air passage hole extending through a lower portion.

5. The grill assembly of claim 4, wherein the dust blocking member further comprises:

a connection member inserted in and connected through the air passage hole of the second cylindrical grill portion, and having a plurality of holes that are portioned by a rib and interconnected with the air passage hole; and a dust blocking plate integrally formed with the connection member and located at a lower portion of the connection member, the dust blocking plate spaced from the connection member by a predetermined distance.

6. The grill assembly of claim 5, wherein the fixing means further comprises:

a fixing groove portion having a pair of grooves formed to be substantially opposite to each other in an inner circumference of the second cylindrical grill portion, and a pair of fixing grooves extending from leading ends of the guiding grooves in a radical direction of the second cylindrical grill portion and in opposite directions from each other; and a fixing protrusion portion formed on an outer circumference of the connection member to mate with the guiding grooves and the fixing grooves of the fixing groove portion.

* * * * *